United States Patent [19]

Berry

[11] 4,065,770
[45] Dec. 27, 1977

[54] DIGITAL SCAN CONVERTERS

[75] Inventor: Thomas Royston Berry, Malvern, England

[73] Assignee: The Secretary of State for Defence in Her Britannic Majesty's Government of the United Kingdom of Great Britain and Northern Ireland, London, England

[21] Appl. No.: 674,333

[22] Filed: Apr. 7, 1976

[30] Foreign Application Priority Data

Apr. 17, 1975 United Kingdom ............... 15973/75

[51] Int. Cl.² ............................................. G01S 7/04
[52] U.S. Cl. ............................................. 343/5 SC
[58] Field of Search ...................................... 343/5 SC

[56] References Cited

U.S. PATENT DOCUMENTS

| 3,633,173 | 1/1972 | Edge | 343/5 SC X |
|---|---|---|---|
| 3,765,018 | 10/1973 | Heard et al. | 343/5 SC |
| 3,810,174 | 5/1974 | Heard et al. | 343/5 SC X |
| 3,827,027 | 7/1974 | Towson et al. | 343/5 SC X |
| 4,002,827 | 1/1977 | Nevin et al. | 343/5 SC |

*Primary Examiner*—T.H. Tubbesing
*Attorney, Agent, or Firm*—Pollock, VandeSande and Priddy

[57] ABSTRACT

A digital scan converter for use with a mobile (eg airborne) radar or other surveillance apparatus, having ground-stabilized storage allocations and apparatus-stabilized display, provisions for polar to cartesian coordinate transformation and scan to scan integration, and having a random-access store in which each store location is arranged to hold the digital data for a plurality of spots on the display.

8 Claims, 9 Drawing Figures

DIGITAL SCAN CONVERTERS

The present invention relates to digital scan converters of the kind wherein digitized data samples are written into and read out from a random access memory by multiplexed input and output scans of different form. Prior equipments of this kind are described in U.S. Pat. Nos. 3,765,018, 3,798,425 and 3,810,174 for instance. The present invention concerns improvements and arrangements in such equipment for the conversion of signals from a mobile surveillance apparatus, e.g. an airborne radar.

According to the present invention there is provided a digital scan converter, comprising means for receiving response signals from a mobile surveillance apparatus; means for digitizing the said response signals and providing digital indications of the positions from which the response signals have been returned, in terms of coordinates related to the instantaneous position of the mobile surveillance apparatus; a position register for receiving and storing the said digital indications of the said instantaneous position; a random-access memory having a multitude of addressable locations in which the digitized response signals may be stored; input scan means for directing the digitized response signals into locations in the random-access memory whose addresses are derived from the said coordinates and the contents of the position register so that each digitized response signal is directed to a location whose address is a function of coordinates of the position from which it was returned to the surveillance apparatus; output scan means for reading out signals from the random-access memory according to a raster scan starting from a location whose address is a function of the contents of the position register; and video display means for providing a visual display in response to the signals read out by the output scan means.

Preferably the random-access memory is constructed to store data in words and is connected so that each word comprises the digitized response signals relating to a plurality of spots which are to be reproduced consecutively in the display.

The output scan means may include a second random-access memory, and a digital integration circuit connected to the data outputs of both random-access memories and to the data input of the second random-access memory so as to build up in each location of the second random-access memory a signal dependent on a weighted summation of successive signals from a corresponding location of the first random-access memory, the video display means being then connected to produce a display in response to signals read out from the second random-access memory.

The mobile surveillance apparatus may be an airborne radar mounted in an aircraft or missile, and the said coordinates may be polar coordinates measured relative to the instantaneous position and heading of the aircraft or missile.

The invention will then in effect provide ground-stabilized storage allocations but will produce an aircraft-stabilized display. That is to say it will direct response signals from any fixed ground target to a corresponding fixed location in the random-access memory, substantially independent of the aircraft's velocity, which is advantageous as it allows scan-to-scan integration to be used to improve the signal-to-noise ratio of the display signals; however, it provides a display representing a field of surveillance which moves with the aircraft and has a constant relationship to the position of the aircraft, which is convenient for pilot guidance and navigation.

Embodiments of the invention will now be described, by way of example, with reference to the accompanying drawings, of which.

Figures 1, 2, 3, 7:
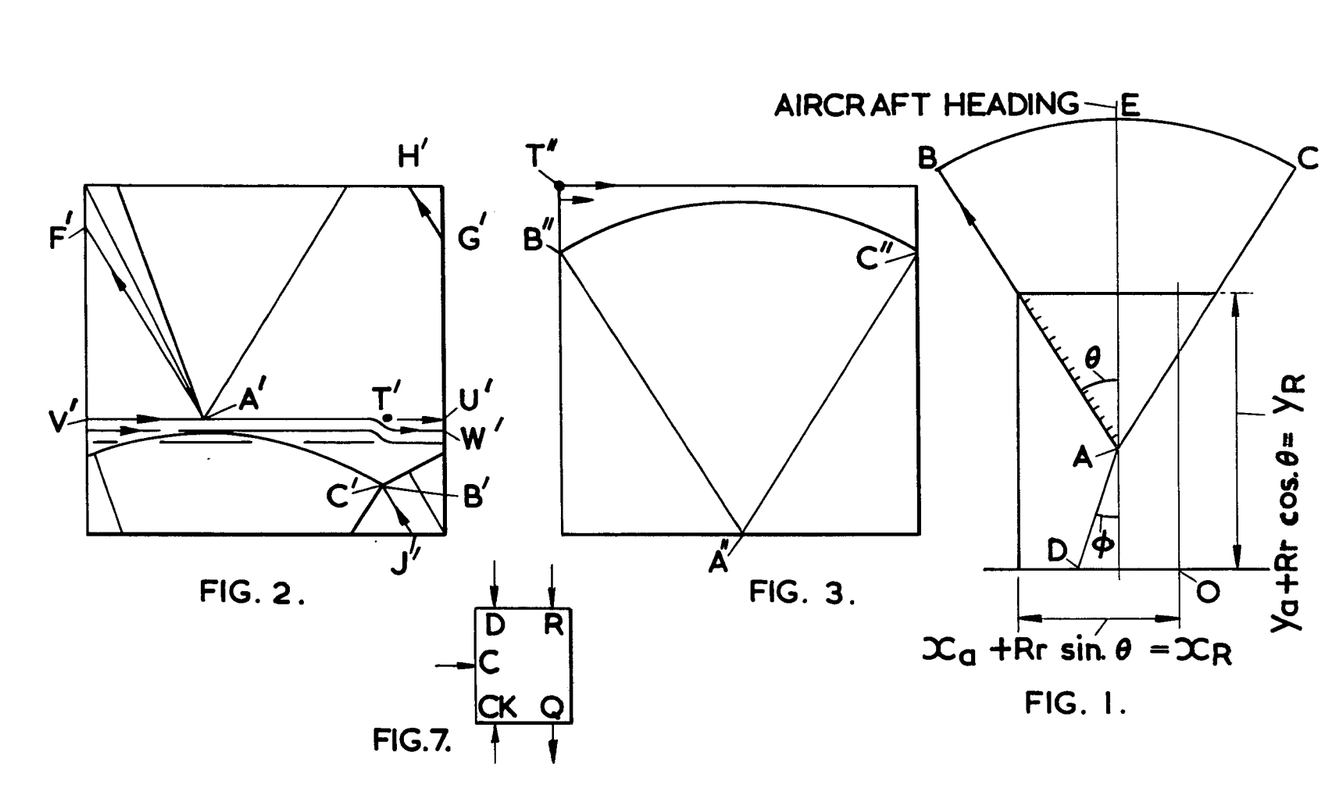
FIG. 1 is a diagram illustrating the geometry and parameters of an airborne radar surveillance system.
FIG. 2 is a diagram illustrating the allocation of response signals derived from the radar system of FIG. 1 to locations of a random-access memory, the input scanning sequence used to write the response signals into the random-access memory, and the output scanning sequence used to read out the response signals from the random-access memory, in the digital scan converter of FIGS. 4, 5 and 6.
FIG. 3 is a diagram illustrating the format of the display produced by the digital scan converter.
FIG. 7 is a diagram of a multi-input bistable circuit used in the circuit of FIG. 6.

In FIG. 1, the point A represents the position of an airborne radar mounted in an aircraft (not shown). The radar has a forward-looking sector scan, covering the sector ABC. The line AE represents the aircraft heading, which is at an angle $\phi$ to a fixed compass direction AD. To simplify matters initially it will be assumed that $\phi$ is substantially constant, or that variations in the aircraft heading are slow enough or slight enough to be ignored. The aircraft's position will be represented hereinafter by variable coordinates $x_a$, $y_a$ with reference to fixed cartesian axes with origin 0. The radar emits pulses of radio-waves in a narrow beam which is swept in azimuth from AB to AC; $\theta$ will be used to represent the instantaneous azimuth relative to the aircraft heading. Responses or reflections from targets along any azimuth will reach the radar in sequence depending on the ranges of the positions from which they are returned. The response signals (or reflections) received by the radar at A are sampled at regular intervals, each interval corresponding to a range increment $r$. Thus the samples taken represent returns from points equispaced on each azimuth, like the spots or gradations shown on line AB in FIG. 1. For the sake of clarity the spots shown in FIG. 1 correspond to a very coarse, infrequent, sampling of the responses. In practice about three hundred samples would be taken for each azimuth, indicating the returns from three hundred equispaced points on a typical radius line AB. If the response samples are numbered serially in order of range, the Rth response will be from a position at range $Rr$ from the radar at A. This position will have coordinates $x_R = x_a + Rr \sin\theta$, $y_R = y_a + Rr \cos\theta$. (In the example of FIG. 1 both $x_a$ and $\theta$ are negative).

The amplitudes of the return samples are digitized, producing a three-bit intensity indication for each sample, and each sample is directed to a location in a random-access memory according to the coordinates ($x_R$, $y_R$) of the position from which it came. FIG. 2 illustrates this allocation. The random-access memory may be considered equivalent to a rectangular array of N × N storage cells with rectangular coordinate addressing. A sample from zero range would be directed to a storage cell at A' having the coordinates ($x_a$, $y_a$) if it were not suppressed in accordance with the usual practice or necessity of suppressing returns from less than a certain minimum range. Successive samples from targets on the line AB will be directed to cells intersected by the line A'F'. In the allocation process, the coordinates $x_R$, $y_R$ may be reduced to numbers modulo N, so that if either coordinate becomes greater tha N-1 or less than zero, carry or borrow digits are neglected so that the allocated cell address coordinates are always within the range from 0 to N-1. Thus when the input scan line A'F' reaches the edge of the array at F', the next sample will be directed to a cell on the opposite edge of the array at G'; the input scan will then proceed to H', and then from J' to B'. Digitized returns from the next pulse, coming from points on a line with a slightly different azimuth in FIG. 1, will be directed to cells on another input scan line starting from A'. The position of A' in the array will vary with the movement of the aircraft A.

FIG. 3 shows the format of a display to be produced by the scan converter. This display is formed by a rectangular raster scan, starting from the point T" and generating successive horizontal lines as in a television scan. The intensity signals for producing this display are taken from an output scan of the random-access memory cells, which starts from a cell T' whose coordinates are given by ($|x_a + \frac{1}{2}N|_{mod\,N}, |y_a|_{mod\,N}$). This output scan starting point T' moves with the aircraft, so that the display shows the returns from the radar field of view (sector ABC in FIG. 1) always in a fixed position A"B"C" on the display (FIG. 3) with the aircraft's position always represented by the point A".

Figure 4:
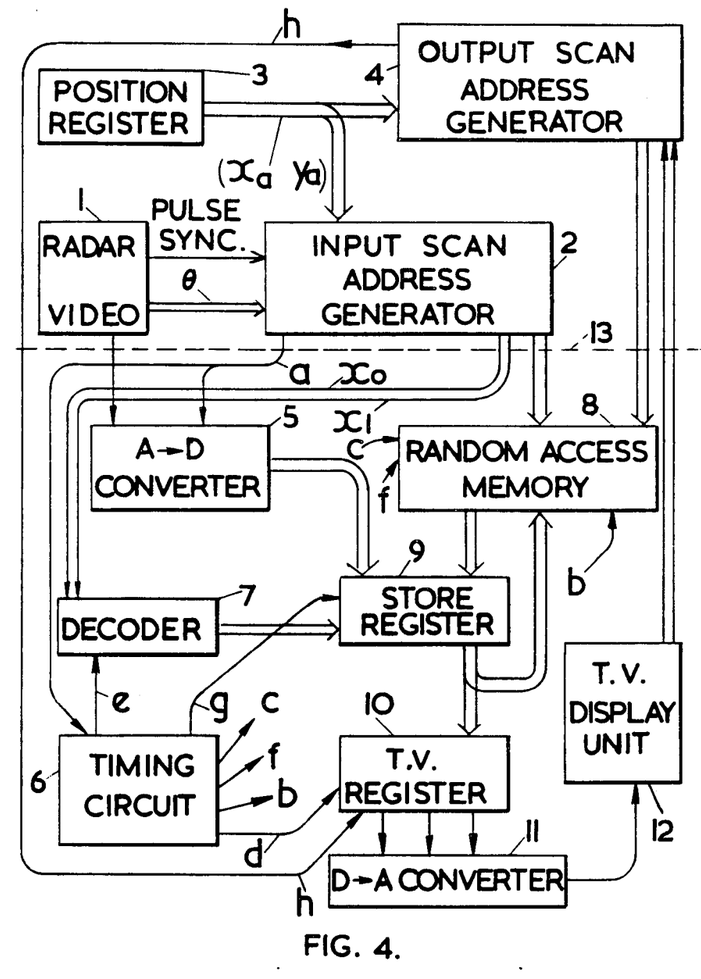
FIG. 4 is a block schematic circuit diagram of the digital scan converter.

FIG. 4 shows the general arrangement of circuits in a digital scan converter for processing the response signals as described with reference to FIGS. 1 to 3. The radar 1 applies azimuth ($\theta$) and radar pulse sync signals to an input scan address generator circuit 2. A position register 3 is connected to present signals representing coordinates ($x_a$, $y_a$) of the instantaneous position of the aircraft to the input scan address generator circuit 2 and to an output scan address generator circuit 4. The response signals are applied by the radar 1 as a video (analogue) waveform to an analogue-to-digital converter 5. The input scan address generator 2 provides signals to control a timing circuit 6 and sampling actions of the converter 5; it also supplies signals to a decoder 7. Both scan address generators (2 and 4) have outputs connected to address inputs of the random-access memory 8 (this is the random-access memory referred to in the description of FIG. 2). The timing circuit 6 has various outputs (e, g, c, f, b, d) respectively connected to gates in the decoder 7, a clearing input of a register 9, read, write and address selection inputs of the random-access memory 8, and a write control input of another register 10. The registers 9 and 10 are hereinafter called the store register and the TV register respectively. The store register 9 also receives control inputs from the decoder 7 and data signals from the converter 5 and the random-access memory 8; it also has data outputs connected to the TV register 10 and the random-access memory 8. The TV register 10 has a shift control input which receives signals from the output scan address generator 4, and has data outputs connected to a digital-to-analogue converter 11. A television display unit 12 receives the analogue output of the converter 11, and supplies frame sync and line sync signals to the output scan address generator 4.

Figure 5:
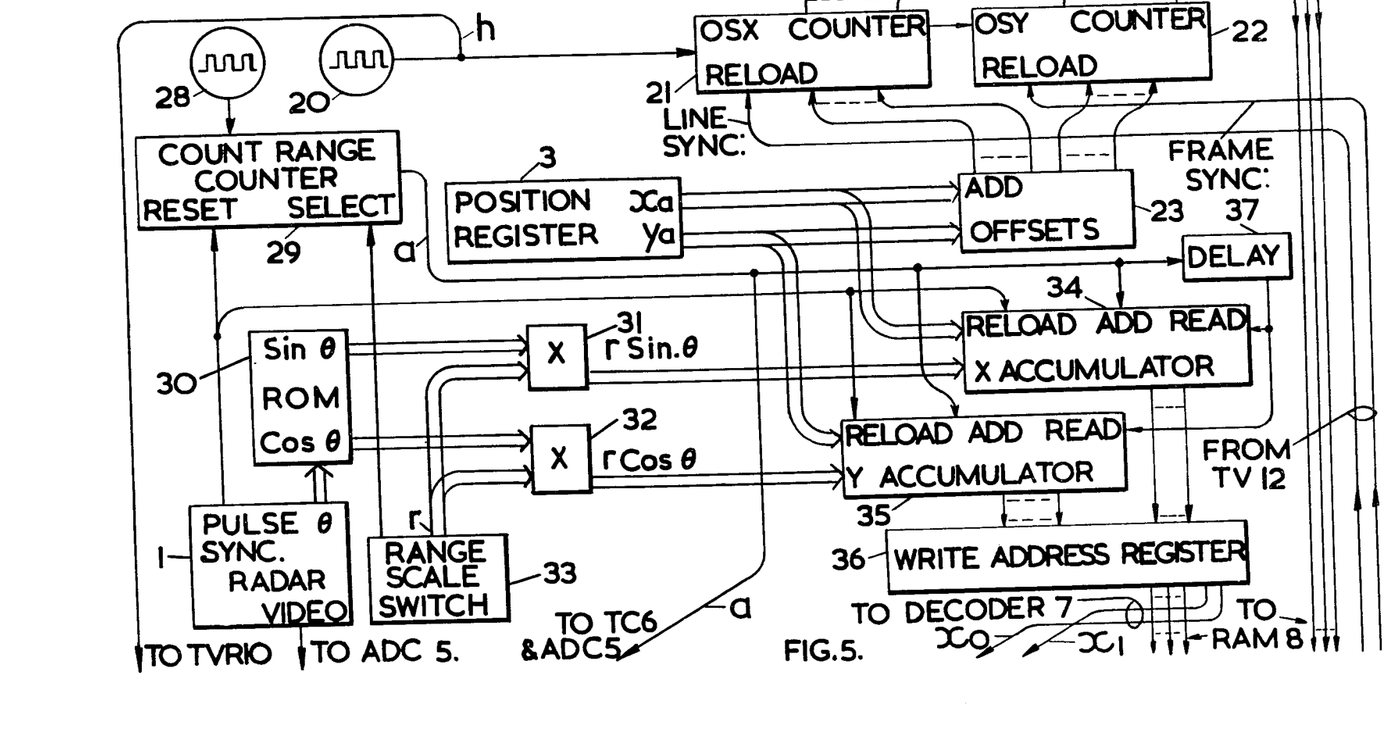
FIGS. 5 and 6 are block schematic circuit diagrams showing the digital scan converter of FIG. 4 in greater detail.
Figure 6:
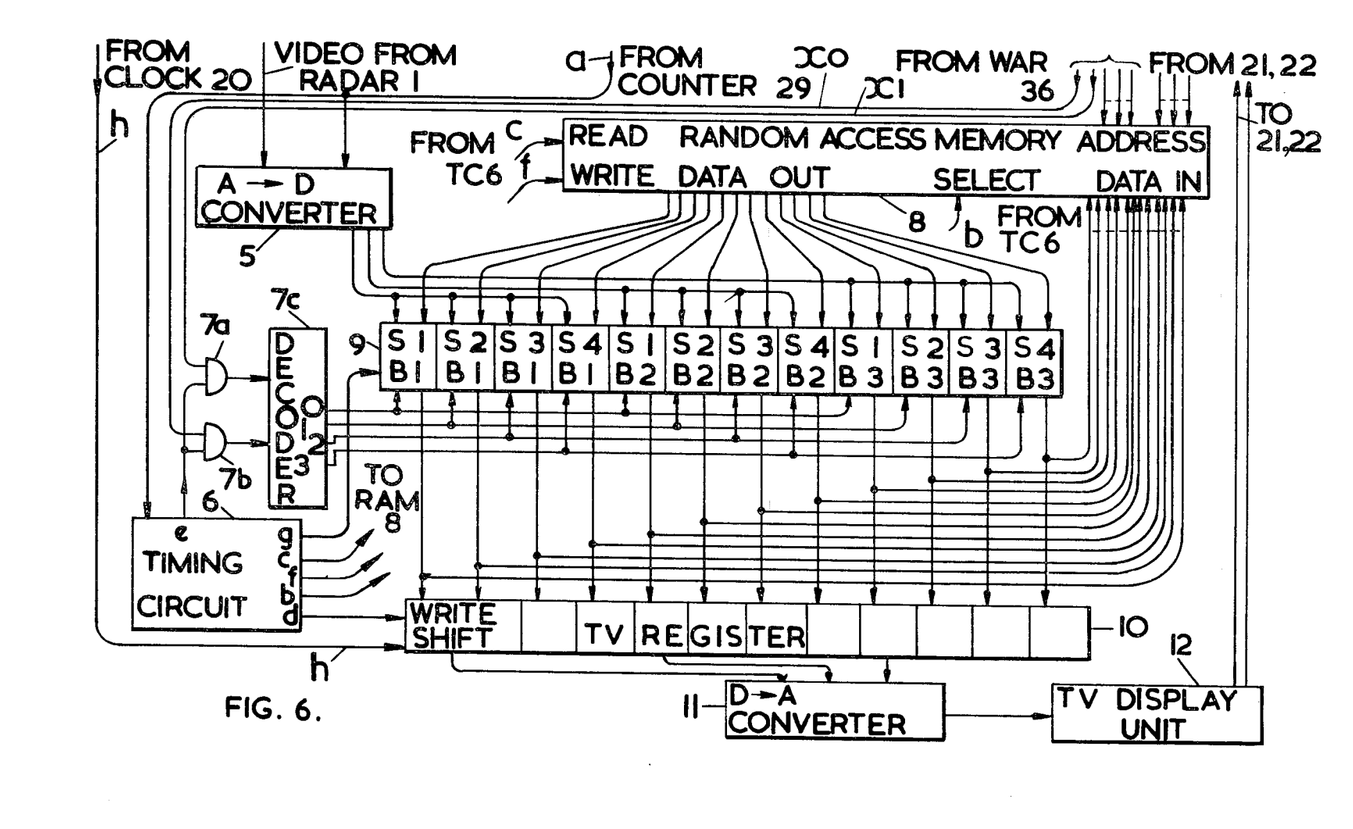

The apparatus of FIG. 4 is shown in greater detail in FIGS. 5 and 6. FIG. 5 shows the parts of FIG. 4 above the broken line 13 in FIG. 4 and FIG. 6 shows those parts below the line 13.

The output scan address generator (4 of FIG. 4) comprises a clock pulse generator 20, two counters 21 and 22 hereinafter called the OSX counter and the OSY counter respectively, and a digital adder unit 23 called the offsets box. The output of the clock pulse generator 20 is connected to the count input of the OSX counter 21 and the overflow output of the OSX counter 21 is connected to the count input of the OXY counter 22. The offsets box 23 receives signals representing the aircraft's position coordinates $x_a$, $y_a$ and adds to them fixed numbers representing the desired difference between the scan starting points A' and T' in FIG. 2. (In the specific case of FIG. 2, A' and T' have the same $y$ coordinate so the $y$ offset will be zero, and the $x$ offset is $\frac{1}{2}$N, but this need not always be the case). The line sync output from the TV display unit (12 of FIG. 4) is applied to a reload control input of the OSX counter 21, so that at the end of every line period the OSX counter is reset to the $x$ coordinate of the output scan starting point T'. Similarly the frame sync output of the TV display unit 12 resets the OSY counter 22 to the $y$ coordinate of T' at the end of every frame. The counters 21 and 22 both have a capacity of N so that they will count from N-1 to 0 or vice versa; the counter 21 counts up but the counter 22 counts down to generate the addresses of the cells intersected by the lines T' U', V' W' etc in order as indicated in FIG. 2. Parallel outputs from the counters 21 and 22 are connected to the random-access memory 8, but the two least significant bits from the OSX counter are not so used; instead the output of the clock pulse generator 20 is connected to control the shifting of signals in the TV register 10 as hereinafter explained.

The input scan address generator (2 in FIG. 4) has to generate in sequence the addresses of cells within which successive sampling points lie. It comprises a clock pulse generator 28, a range counter 29, a read-only memory 30, two digital multipliers 31, 32, a range scale switch unit 33, two counters 34, 35, a write address register 36 and a delay unit 37.

The pulse sync output of the radar 1 resets the counter 29 to all zeros just after the transmission of each radar pulse. The capacity of the counter 29 is controlled by a signal or signals from the range scale switch unit 33 and is so related to the repetition rate of the clock-pulses from the generator 28 that the overflow output of the counter 29 will be energized repetitively with a period equal to the time delay associated with a range increment $r$. This overflow output is used to initiate sampling actions of the analogue-to-digital converter 5 and updating actions in the counters 34, 35, so that the radar returns are sampled at times corresponding to equispaced points as hereinbefore described with reference to FIG. 1.

The radar 1 applies signals representing the radar beam azimuth ($\theta$ in FIG. 1) to the address input of the read-only memory 30, which is arranged to present the corresponding values of cos $\theta$ and sin $\theta$ to the digital multipliers 31 and 32 respectively. The multipliers 31 and 32 also receive digital representations of the range increment size $r$ from the range scale switch unit 33, and therefore form outputs representing the quantities $r \sin \theta$, $r \cos \theta$ respectively. The counter 34, hereinafter called the X accumulator, has separate data inputs connected to receive signals representing $x_a$ from the position register 3 and signals representing $r \sin \theta$ from the multiplier 31, a reload control input connected to receive the pulse sync signal from the radar 1, and an add control input connected to receive the overflow output signals from the counter 29. When the pulse sync signal line is energized, immediately after the transmission of each radar pulse, the X accumulator is reset to the instantaneous value of $x_a$; thereafter, every time the overflow output of the counter 29 is energized, $r \sin \theta$ is added to the contents of the X accumulator. The counter 35, hereinafter called the Y accumulator, is similarly arranged to start from $y_a$ in response to each pulse sync signal and to add successive increments of $r \cos \theta$ to its contents. Thus the contents of the X and Y accumulators are made to form the $x$ and $y$ coordinates of successive sample points. To prevent the cumulative errors becoming intolerable the values of $\sin \theta$ and $\cos \theta$ must be specified rather accurately, but the least significant bits on the X and Y accumulators can be neglected, only the more significant bits being needed to specify the corresponding cell addresses. The output of the range counter 29 is also applied via the delay unit 37 to read-out control points on the X and Y accumulators 34, 35. This causes the appropriate cell addresses to be read out from the accumulators 34, 35 into the write address register 36. Those outputs of the write address register 36 which represents the two least significant bits $x_o$, $x_1$ of the $x$ coordinate of the cell address are connected to the decoder 7, while the other outputs (representing more significant $x$ coordinate bits and all the $y$-coordinate bits) are presented to one set of address inputs of the random-access memory 8.

As shown in FIG. 6, the video output waveform from the radar 1 is connected to the anglogue-to-digital converter 5 in which it is sampled under the control of the signals from the range counter 29. The converter 5 generates a three-bit number to represent the amplitude of each sample, and has a parallel output connected to appropriate inputs of the store register 9. The store register 9 is used to control the input and output of signals from the random-access memory 8 and to enable the signals to be modified as required in the input scanning process. It comprises twelve multi-input bistable circuits of the kind shown in FIG. 6. Each of these bistable circuits has a clearing input C which sets the bistable output Q to binary zero whenever it is energized, a resetting input R which resets Q to binary one whenever it is energized with a binary one signal, and a data input D which is controlled by a clock input CK so that the output Q is set or reset to match the data signal applied to the input D whenever the clock input CK is energized.

The random-access memory 8 is constructed to store data in twelve-bit words, and each word stored in it will comprise the digitized values of samples returned from locations associated with four cells of FIG. 2 which are consecutive in the output scan ($x$) direction. Each word will be used to control the brightness of four successive "spots" on the TV display of the unit 12. (In practice smoothing may be applied so that the display will not actually reproduce discrete spots for successive responses in the output scan). In FIG. 6 the bistable circuits of the store register 9 are labelled to show their allocation for handling the three bits for each of four spots; the label S2 B1 for instance indicates the bistable used to handle the first (least significant) bit of the second spot in each word. The outputs of the analogue-to-digital converter 5 are connected to the D inputs of the appropriate bistable circuits of the store register 9. The data out terminals of the random-access memory 8 are connected to the R inputs of the bistable circuits of the store register 9.

The decoder (7 of FIG. 4) is shown to include two gates 7a and 7b, controlled by the timing circuit 6, for passing the $x_o$ and $x_1$ outputs of the write address register (36 of FIG. 5) to the decoder proper 7c which is a selector circuit which will energize one of its four outputs 0, 1, 2, 3 according to the value of the digits $x_1 x_o$. These four outputs are connected to the clock inputs CK of the bistable circuits for spots 1, 2, 3 and 4 respectively of a typical word. The Q outputs from the bistable circuits are connected to corresponding parallel inputs of the TV register 10 and corresponding data inputs of the random-access memory 8. The TV register 10 has a write control input controlled by the timing circuit 6, and a shift input controlled by the signals from the clock pulse generator 20 of FIG. 5. The first, fifth and ninth sections of the TV register 10 are connected to the inputs of the digital-to-analog converter 11. As hereinbefore stated the output from the converter 11 is fed to the TV display unit 12, and line and frame sync signals from the TV display unit are applied to the counters 21 and 22 of FIG. 5.

Figure 8:
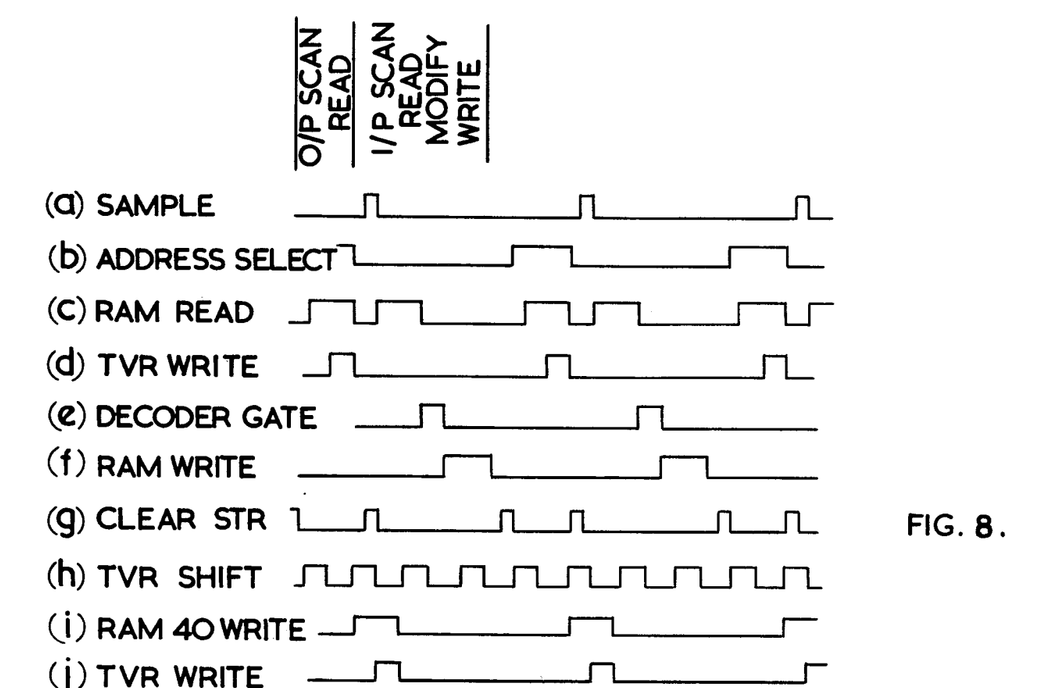
FIG. 8 is a graphical diagram of waveforms and timing signals involved in the operation of the converter of FIGS. 4, 5 and 6 and in the modification of FIG. 9.

The timing circuit 6 receives the sampling control signals from the counter 29. As well as controlling the decoder gates 7a, 7b and write control input of the TV register 10, it also provides various waveforms to control the random-access memory 8 and to clear the store register 9. These and other signals previously mentioned have waveforms as illustrated at ($a$) to ($h$) in FIG. 8; the lines or connections on which they occur are correspondingly labelled from ($a$) to ($h$) in FIGS. 4, 5 and 6. The waveforms ($i$) and ($j$) in FIG. 8 are used in the modification which is described later with reference to FIG. 9. The waveform at ($a$) represents the sampling control signals formed by the counter 29 of FIG. 5, which also controls the timing circuit 6 of FIGS. 4 and 6. The waveform at ($b$) is applied by the timing circuit 6 to the address selection input of the random-access memory 8; when this waveform is at the binary one level the random-access memory responds to the inputs from the counters 21 and 22 (that is the output scan addresses), whereas when it is at the zero level the random-access memory responds to the inputs from the write address register 36 (that is the input scan addresses). The waveform at ($c$) is applied by the timing circuit 6 to the read control input of the random-access memory 8; it causes the contents of the addressed word storage location to be read out into the store register 9. As indicated the actions of the apparatus are periodic each period comprising a short interval devoted to the output scan and a longer interval associated with the input operations. As shown in FIG. 8, first there is a readout of one word for the output scan, which is transmitted into the TV register 9 because its write control input is simultaneously energized by the waveform ($d$). Then the store register 9 is cleared (by the waveform ($g$) from the timing circuit 6) while the analogue-to-digital converter 5 digitizes a new sample of the radar video signal. Next the random-access memory provides another read-out to the store register 9, from the input scan address this time. This read-out is a word representing the amplitudes of responses from four consecutive cells, and in general will need to be modified in relation to just one of these cells to bring it up to date in accordance with the newly-digitized sample. When the least significant bits of the x coordinate of the input scan address are applied to the decoder 7c (through the gates 7a, 7b enabled by waveform (e) from the timing circuit 6) it energizes the clock inputs of the bistable circuits associated with the response which is to be updated. This enables the outputs of the converter 5 to change the states of these bistable circuits as required. The timing circuit then energizes the write control input of the random-access memory 8 with the waveform (f), causing it to write the modified signals from the store register 9 into its location at the input scan address. Meanwhile the pulses (h) from the clock pulse generator 20 shift the signals held in the TV register, so that the converter 11 receives the signals associated with the four samples represented in the word read-out from the output scan address. The converter output is smoothed and applied to the TV display as a video picture signal.

Clearly in this system the responses from four cells are read out for every one sample which is entered in the stored display information. This ratio is convenient as it allows a desirable output and display scan rate while also allowing time for the acceptance of information as it is made available by present radar equipment, but obviously straightforward modifications could be applied to achieve a different ratio if desired.

Figure 9:
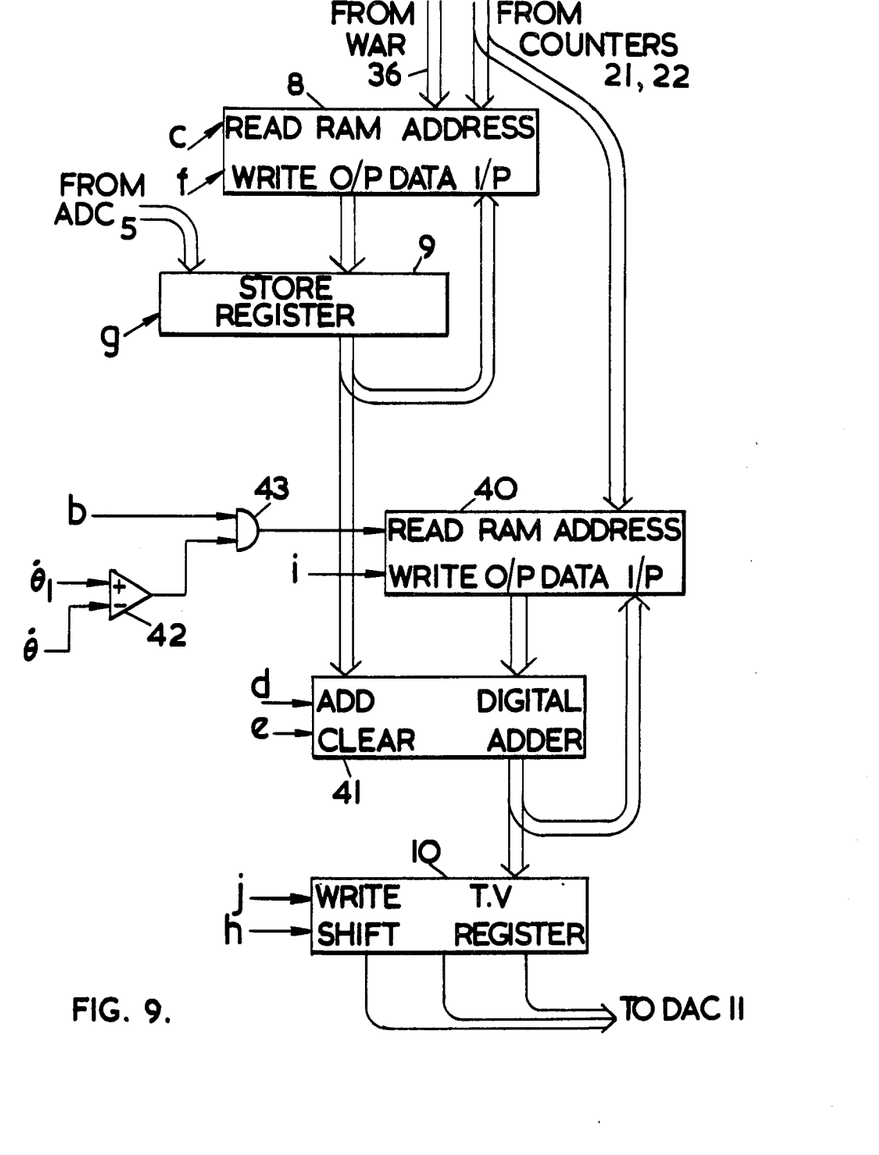
FIG. 9 is a block schematic circuit diagram of modifications which may be applied to the converter of FIGS. 4, 5 and 6 in order to provide a scan-to-scan integration facility.

The apparatus may be modified to provide a facility for scan-to-scan integration, that is for presenting a display dependent on an integration or weighted summation of corresponding responses from a plurality of complete azimuth scans of the radar 1. FIG. 9 and the waveforms (i) and (j) of FIG. 8 indicate suitable modifications for this purpose. The random-access memory 8, the store register 9, and the parts which supply signals to them (not shown in FIG. 9 but provided as in FIGS. 4 to 6) are arranged as before but the outputs of the store register 9 are connected to a digital adder circuit 41 instead of to the TV register 10. A second random-access memory 40 has address inputs connected to receive the output scan address signals from the counters 21 and 22, data outputs connected to the adder 41 and the TV register 10, and data inputs connected to receive the outputs of the adder 41. The outputs of the adder 41 are connected to the parallel data inputs of the TV register 10. A signal representing the rate of change of aircraft heading $\dot{\theta}$, obtained from a transducer (not shown), and a signal $\dot{\theta}_1$ representng a predetermined value of $\dot{\theta}$, are applied to complementary inputs of a differential amplifier 42. The output of this amplifier 42 and the signal (b) from the timing circuit 6 are connected to separate inputs of an and-gate 43. The output of the and-gate 43 is connected to the read control input of the random-access memory 40. The signal represented at (i) in FIG. 8 is applied to the write control input of the random-access memory 40. Signals (d) and (e) from the timing circuit 6 are connected to Add and Clear control inputs respectively of the adder 41. Signals (j) and (h) are applied to the write and shift inputs respectively of the TV register 10. These signals also come from the timing circuit 6 and are shown in FIG. 8.

With this arrangement the signals read out from each output scan address in the random-access memory 8 are added in the adder 41 to signals from the same address in the random-access memory 40, which (as long as the rate of change of heading $\dot{\theta}$ is negligible) will represent an accumulated result of returns from the same position received in previous scans. The adder 41 may be arranged to form a weighted summation of the signals presented to it. The resultant signals are then fed to the TV register 10 so as to control the TV display, and are also fed to replace the existing signals stored in the location of the random-access memory 40 concerned in the action.

However, if the heading changes abruptly, the return signals will be sent to locations different from those to which previous returns from the same positions were directed. In this situation scan-to-scan integration would only confuse the display. Hence the amplifier 42 is arranged to inhibit the application of the signal (b) to the random-access memory 40 whenever the rate of change of heading $\dot{\theta}$ exceeds the predetermined value $\dot{\theta}_1$.

An alternative modification would be to add signals representing the aircraft heading $\phi$ to the radar azimuth signals representing $\theta$, so that the input scan address generator operates on $(\theta + \phi)$ instead of $\theta$. In this case a proportion of the time-base waveform of the TV display unit 12, controlled by signals representing $\phi$, may be added to its vertical deflection circuits so as to tilt its line-scan direction at an angle $\phi$ to the horizontal.

Clearly various other modifications can be made and will be obvious to persons skilled in the art. For instance, the outputs from the radar 1, instead of being used directly may be taken to a buffer store and read-outs from this buffer store can be controlled by the pulse generator 20.

The accumulators 34 and 35 could be controlled by the pulse generator 20 to act as a buffer store. Instead of having a TV display unit 12 which provides line sync and frame sync signals to control itself and the counters 21 and 22, some other counters may be connected to derive line sync and frame sync signals by counting pulses from the pulse generator 20 for controlling the TV display unit 12 and the counters 21, 22. The apparatus can clearly be extended to provide for any desired number of bits to represent the intensities of the radar return signals, to provide for any practicable sampling rate, and to provide for any desired rectangular TV display format. The system can be normalized so that the range increments $r$ are regarded as units of distance, $r = 1$, and the multipliers 31, 32 can be replaced by direct connections to the counters 34, 35.

I claim:

1. A digital scan converter, comprising means for receiving response signals from a mobile surveillance apparatus; means for digitizing the said response signals and providing digital indications of the positions from which the response signals have been returned, in terms of coordinates related to the instantaneous position of the mobile surveillance apparatus; a position register for receiving and storing digital indications of the said instantaneous position; a random-access memory having a multitude of addressible locations in which the digitized response signals may be stored; input scan means for directing the digitized response signals into locations in the random-access memory whose addresses are derived from the said coordinates and the contents of the position register so that each digitized response signal is directed to a location whose address is a function of coordinates of the position from which it was returned to the surveillance apparatus; output scan means for reading out signals from the random-access memory according to a raster scan starting from a location whose address is a function of the contents of the position register; and video display means for providing a visual display in response to the signals read out by the output scan means.

2. A digital scan converter as claimed in claim 1 and wherein the random-access memory includes means for storing data in words each comprising a specified number of digital signals, each word stored in said random-access memory comprising the digitized response signals relating to a plurality of spots which are to be reproduced consecutively in the display.

3. A digital scan converter as claimed in claim 1 and wherein each addressible location in the random-access memory comprises means for storing the digits of a plurality of the digitized response signals; the input scan means comprising means for generating sequences of multi-bit address signals and for directing each digitized response signal according to one of the multi-bit address signals so that at least one least significant bit of each address signal is used to direct the digitized response signal to particular bit positions in an addressible location specified by the more significant bits of the address signal; the output scan means and video display means being connected to co-operate with said random-access memory to cause the digitized response signals stored in each addressible location in the random-access memory to be read out and used to control consecutive and adjacent increments of the visual display.

4. A digital scan converter as claimed in claim 1 and wherein the output scan means comprises a second random-access memory digital integration circuit means for making a weighted summation of signals in corresponding locations of both random-access memories and replacing the signals in the second random-access memory with the results of these summations, and means for applying signals from the second random-access memory to the visual display means.

5. A digital scan converter as claimed in claim 1 and wherein each location of the random-access memory includes means for storing a data word comprising enough bits to represent a plurality of the digitized response signals, said random-access memory being connected to receive digitized response signals returned from a plurality which are to be represented consecutively in the visual display.

6. A digital scan converter as claimed in claim 1 and wherein the said means for digitizing the said response signals and providing digital indications of the positions from which the response signals have been returned comprises means for sampling the response signals at regular intervals and for forming digital representations of sampled values of the response signals, and means for forming a sequence of multi-bit address signals representing relative co-ordinates of the positions from which the sampled values of the response signals have been returned.

7. A digital scan converter as claimed in claim 6 and wherein each of the said locations in the random-access memory comprises means for storing a data word comprising enough bits to represent a plurality of said digital representations of sampled values, the said input scan means comprising means operative to direct the digital representation of a single sampled value into a specific storage area determined by at least one bit of a concurrent multi-bit address signal within a location whose address is a function of the other bits of the concurrent multi-bit address signal, in each of the said regular intervals, and the said output scan means comprises an output register constructed and connected to receive the whole contents of one of the said locations of the random-access memory representing a plurality of sampled response signal values during each of the said regular intervals, and means for presenting the said contents to the video display means in a plurality of steps so that the successive sampled values control consecutive increments of the visual display.

8. A digital scan converter as claimed in claim 6 and wherein the said means for forming the multibit address signals comprises means for forming digital representations of co-ordinate increments $r \sin \theta$ and $r \cos \theta$ wherein $r$ is the range increment corresponding to the duration of one of the said regular intervals and $\theta$ represents the azimuthal direction from which the response signals are being received, an accumulator register, and means for entering signals from the position register into the accumulator register for forming the multibit address signals by successive additions of the representations of $r \sin \theta$ and $r \cos \theta$ to the contents of the accumulator register in synchronism with the sampling actions.

* * * * *